United States Patent
Chao et al.

(10) Patent No.: US 8,782,685 B1
(45) Date of Patent: Jul. 15, 2014

(54) METHOD FOR GENERATING A FAVORITE CHANNEL LIST AND RELATED DEVICE THEREOF

(71) Applicant: AmTRAN Technology Co., Ltd., New Taipei (TW)

(72) Inventors: Kuang-Cheng Chao, New Taipei (TW); Ying-Wen Huang, New Taipei (TW)

(73) Assignee: AmTRAN Technology Co., Ltd, Jhonghe District, New Taipei (TW)

( * ) Notice: Subject to any disclaimer, the term of this patent is extended or adjusted under 35 U.S.C. 154(b) by 0 days.

(21) Appl. No.: 13/798,261

(22) Filed: Mar. 13, 2013

(30) Foreign Application Priority Data

Dec. 27, 2012 (TW) .............................. 101150460 A

(51) Int. Cl.
*H04H 60/32* (2008.01)
*H04N 21/482* (2011.01)

(52) U.S. Cl.
CPC ................... *H04N 21/482* (2013.01)
USPC .................................... 725/14; 725/9; 725/46

(58) Field of Classification Search
USPC ......................................... 725/14, 46
See application file for complete search history.

(56) References Cited

U.S. PATENT DOCUMENTS

| | | | | | |
|---|---|---|---|---|---|
| 4,425,579 | A | * | 1/1984 | Merrell | 725/151 |
| 5,592,551 | A | * | 1/1997 | Lett et al. | 380/211 |
| 2003/0115589 | A1 | * | 6/2003 | D'Souza et al. | 725/10 |
| 2007/0199040 | A1 | * | 8/2007 | Kates | 725/134 |

* cited by examiner

*Primary Examiner* — Robert Hance
(74) *Attorney, Agent, or Firm* — Winston Hsu; Scott Margo

(57) ABSTRACT

A method for generating a favorite channel list, where a device for generating the favorite channel list includes a receiver and a processor, is disclosed. The method includes receiving a signal of a first channel of a television signal by the receiver; clearing channels stored in the favorite channel list by the processor before the receiver receives the television signal according to the television signal; and adding the first channel to the favorite channel list by the processor when the signal of the first channel is switched from a first program to an advertisement.

8 Claims, 3 Drawing Sheets

US 8,782,685 B1

METHOD FOR GENERATING A FAVORITE CHANNEL LIST AND RELATED DEVICE THEREOF

BACKGROUND OF THE INVENTION

1. Field of the Invention

The present invention relates to a method for generating a favorite channel list and a related device thereof, and particularly to a method and a related device thereof that can generate a favorite channel list according to a condition corresponding to a signal of a channel of a television signal being switched from a program to an advertisement.

2. Description of the Prior Art

In the prior art, many television remote controls can have a "LAST" key, and the "LAST" key is used for adding a channel watched by a user over a predetermined time (e.g. 10 minutes) to a favorite channel list. That is to say, when the user keeps watching the channel over the predetermined time, it is meant that the user is interested in the channel. Thus, the favorite channel list can store channels which interest the user, and the user can utilize the "LAST" key to browse the channels stored in the favorite channel list.

However, it is difficult for the prior art to determine length of the predetermined time. That is to say, if the predetermined time is too long, the user may miss some favorite channels; and if the predetermined time is too short, the channels stored in the favorite channel list may be very indiscriminate. Therefore, the prior art is not a good choice for the user.

SUMMARY OF THE INVENTION

An embodiment provides a method for generating a favorite channel list, where a device for generating the favorite channel list comprises a receiver and a processor. The method includes receiving a signal of a first channel of a television signal by the receiver; clearing channels stored in the favorite channel list before the receiver receives the television signal according to the television signal by the processor; and adding the first channel to the favorite channel list when the signal of the first channel is switched from a first program to an advertisement by the processor.

Another embodiment provides a method for generating a favorite channel list, where a device for generating the favorite channel list comprises a receiver and a processor. The method includes receiving a signal of a first channel of a television signal by the receiver; clearing channels stored in the favorite channel list by the processor before the receiver receives the television signal according to the television signal; and not removing the first channel from the favorite channel list and executing a corresponding operation by the processor according to whether the receiver keeps receiving the television signal when the signal of the first channel is a first program and the processor switches the signal of the first channel to a signal of a second channel of the television signal according to a control command signal generated by a LAST key.

Another embodiment provides a method for generating a favorite channel list, where a device for generating the favorite channel list comprises a receiver and a processor. The method includes receiving a signal of a first channel of a television signal by the receiver; clearing channels stored in the favorite channel list by the processor before the receiver receives the television signal according to the television signal; and removing the first channel from the favorite channel list by the processor when the signal of the first channel is a first program and the processor switches the signal of the first channel to a signal of a second channel of the television signal according to a control command.

Another embodiment provides a device for generating a favorite channel list. The device includes a receiver and a processor. The receiver is used for receiving a signal of a first channel of a television signal. The processor is used for determining whether the signal of the first channel is switched from a first program to a first advertisement, wherein the processor adds the first channel to the favorite channel list when the signal of the first channel is switched from the first program to the first advertisement.

The present invention provides a method for generating a favorite channel list and a related device thereof. The method and the device utilize a processor to add a channel of a television to a favorite channel list when a signal of the channel of the television signal is switched from a program to an advertisement. Therefore, compared to the prior art, because conditions for the present invention generating the favorite channel list do not include time for a user keeping watching a channel of the television signal, the present invention can overcome disadvantages of the prior art.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
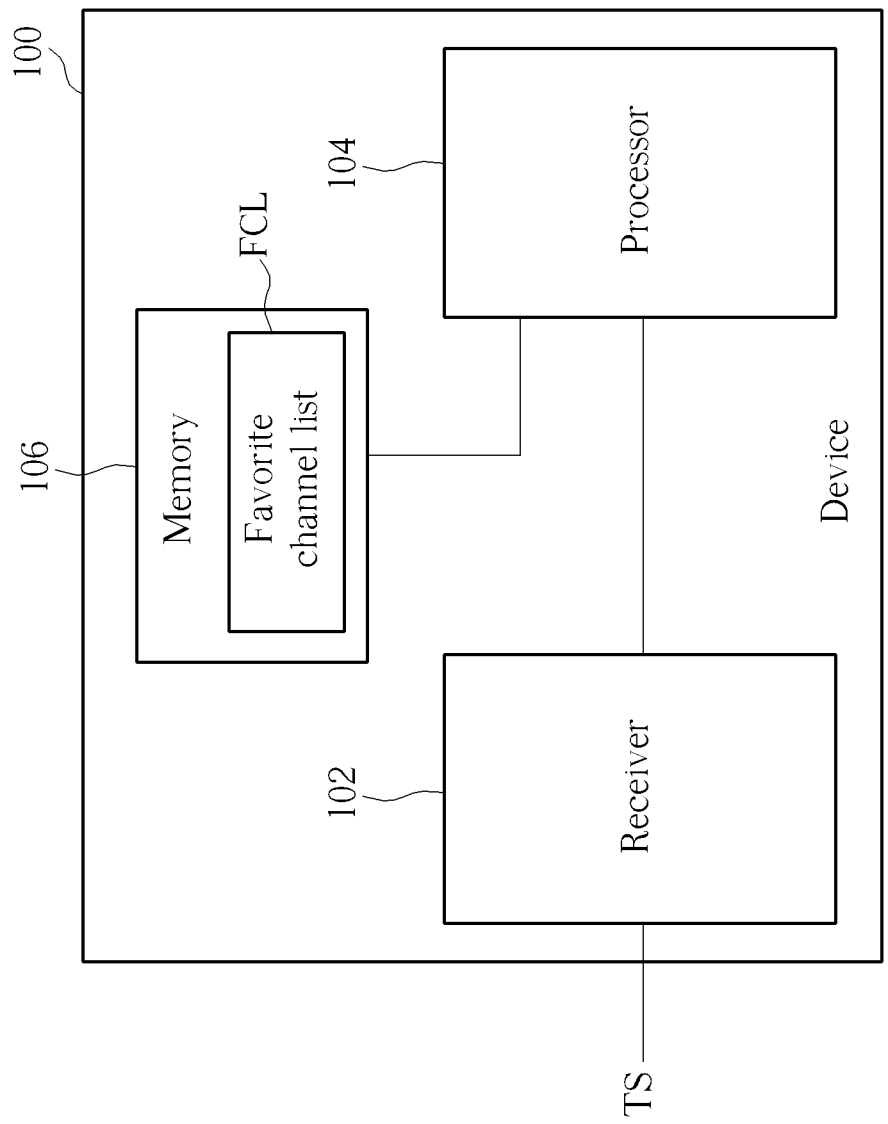
FIG. 1 is a diagram illustrating a device for generating a favorite channel list according to an embodiment.
Figure 2:
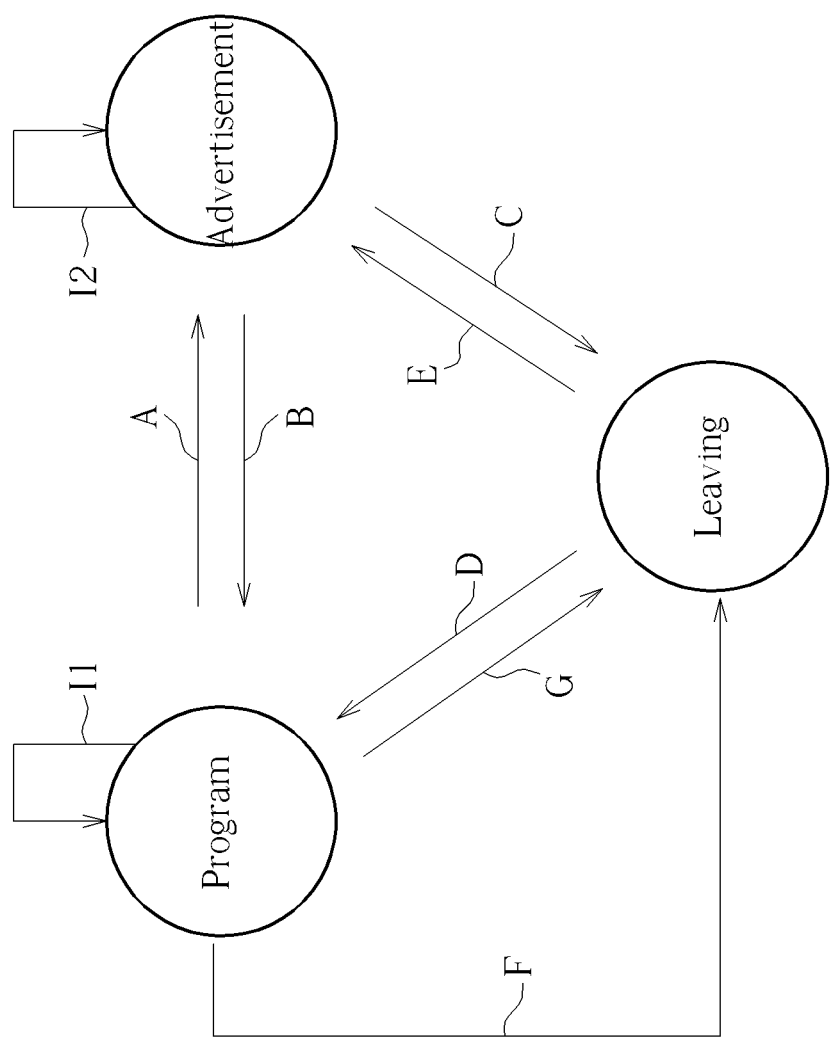
FIG. 2 is a diagram illustrating a state diagram of the device generating the favorite channel list.

Please refer to FIG. 1 and FIG. 2. FIG. 1 is a diagram illustrating a device 100 for generating a favorite channel list FCL according to an embodiment, and FIG. 2 is a diagram illustrating a state diagram of the device 100 generating the favorite channel list FCL, where the device 100 can be included in a television, but the present invention is not limited to the device 100 being included in the television. The device 100 includes a receiver 102, a processor 104, and a memory 106, where the receiver 102 can be a tuner of the television, the processor 104 can be an application processor or a multimedia processor including an application processing core, and the memory 106 can be a volatile memory (e.g. static random access memory (SRAM) or dynamic random access memory (DRAM)) or a non-volatile memory (e.g. Flash) of the television. The receiver 102, the processor 104, and the memory 106 can be independent each other, or two or more of the receiver 102, the processor 104, and the memory 106 can be integrated into a system on chip (SoC) or a system in package (SiP). But, the present invention is not limited to the system on chip or the system in package. The receiver 102 is used for receiving a television signal TS, where the television signal TS includes a plurality of channel signals. When the receiver 102 is switched to receive a signal of a first channel of the television signal TS from another signal source, the processor 104 of the device 100 can generate the favorite channel list FCL according to the state diagram in FIG. 2. In addition, when the receiver 102 is switched to receive the signal of the first channel of the television signal TS from another signal source, the processor 104 can clear channels stored in the favorite channel list FCL before the receiver 102 receives the television signal TS according to the television signal TS, where the favorite channel list FCL is included in the memory 106 of the device 100. The processor 104 can also clear the channels stored in the favorite channel list FCL according to starting to play a new program, logging in a new account, or operation of a user interface except switching television signal sources. But, the present invention is not limited to the processor 104 clearing channels stored in the favorite channel list FCL according to starting to play a new program, logging in a new account, or operation of a user interface. In addition, the processor 104 can also clear the channels stored in the favorite channel list FCL according to a plurality of conditions.

FIG. 2 is the state diagram representing a channel (e.g. the first channel), that is, each channel has an independent state diagram. Take FIG. 2 as an example, the receiver 102 is switched to receive the signal of the first channel of the television signal TS from another signal source, and the signal of the first channel is a first program. That is to say, an initial state of the state diagram of the first channel is switched from a "leaving" state to a "program" state through a path D as shown in FIG. 2. When the signal of the first channel is switched from the first program to an advertisement (a path A as shown in FIG. 2), the processor 104 adds the first channel to the favorite channel list FCL, where the processor 104 can determine that the signal of the first channel is switched from the first program to the advertisement according to predetermined black frames between the first program and the advertisement, and add the first channel to the favorite channel list FCL according to a determination result. But, the present invention is not limited to the processor 104 determining that the signal of the first channel is switched from the first program to the advertisement according to the predetermined black frames between the first program and the advertisement. That is to say, the processor 104 can also determine that the signal of the first channel is switched from the first program to the advertisement according to the prior art. Meanwhile, the state diagram of the first channel is in an "advertisement" state. Then, if the advertisement is completed and the signal of the first channel is switched to the first program again (a path B as shown in FIG. 2), the state diagram of the first channel is in the "program" state again. If the signal of the first channel is the advertisement and the processor 104 switches the signal of the first channel to a signal of a second channel of the television signal TS according to a control command generated by a LAST key or a first key, the state diagram of the first channel can enter the "leaving" state (a path C as shown in FIG. 2). In addition, after the processor 104 switches the signal of the first channel to the signal of the second channel according to the control command generated by the LAST key or the first key, a state diagram of the second channel can be switched from the "leaving" state to the "program" state (the path D as shown in FIG. 2) or to the "advertisement" state (a path E as shown in FIG. 2) according to the signal of the second channel (e.g. a program or an advertisement), respectively; and when the processor 104 switches to receive a signal from another signal source according to a control command generated by a signal source key, the processor 104 stops adding any channel to the favorite channel list FCL.

As shown in FIG. 2, when the signal of the first channel is the first program and the processor 104 switches the signal of the first channel to a signal of a third channel of the television signal TS (a path F as shown in FIG. 2) according to the control command generated by the LAST key, the processor 104 does not remove the first channel from the favorite channel list FCL. Meanwhile, the state diagram of the first channel is in the "leaving" state. In addition, after the processor 104 switches the signal of the first channel to the signal of the third channel according to the control command generated by the LAST key, a state diagram of the third channel can be switched from the "leaving" state to the "program" state (the path D as shown in FIG. 2) or to the "advertisement" state (a path E as shown in FIG. 2) according to the signal of the third channel (e.g. a program or an advertisement), respectively.

As shown in FIG. 2, when the signal of the first channel is the first program and the processor 104 switches the signal of the first channel to a signal of a fourth channel of the television signal TS (a path G as shown in FIG. 2) according to a control command generated by a second key, the processor 104 can remove the first channel from the favorite channel list FCL. Meanwhile, the state diagram of the first channel is in the "leaving" state. In addition, after the processor 104 switches the signal of the first channel to the signal of the fourth channel according to the control command generated by the second key, a state diagram of the fourth channel can be switched from the "leaving" state to the "program" state (the path D as shown in FIG. 2) or to the "advertisement" state (the path E as shown in FIG. 2) according to the signal of the fourth channel (e.g. a program or an advertisement), respectively.

Take FIG. 2 as an example, the receiver 102 is switched to receive the signal of the first channel of the television signal TS from another signal source, and the signal of the first channel is the advertisement. That is to say, the state diagram of the first channel is switched from the "leaving" state to the "advertisement" state (the path E as shown in FIG. 2). Therefore, when the state diagram of the first channel is in the "advertisement" state, if the advertisement is completed and the signal of the first channel starts to play the first program (the path B as shown in FIG. 2), the state diagram of the first channel is in the "program" state. If the signal of the first channel is the advertisement and the processor 104 switches the signal of the first channel to a signal of a fifth channel of the television signal TS according to a control command generated by the LAST key or a third key, the state diagram of the first channel can enter the "leaving" state (the path C as shown in FIG. 2). In addition, after the processor 104 switches the signal of the first channel to the signal of the fifth channel according to the control command generated by the LAST key or the third key, a state diagram of the fifth channel can be switched from the "leaving" state to the "program" state (the path D as shown in FIG. 2) or to the "advertisement" state (the path E as shown in FIG. 2) according to the signal of the fifth channel (e.g. a program or an advertisement), respectively.

In addition, because the processor 104 mistakes a program or an advertisement to cause the state gram of the first channel in FIG. 2 is in the "program" state (in fact, the signal of the first channel is the advertisement), if the processor 104 detects that the first channel is switched from the advertisement to the first program, the state gram of the first channel in FIG. 2 is switched from the "program" state to the "program" state again through a path I1. Similarly, because the processor 104 mistakes a program or an advertisement to cause the state gram of the first channel in FIG. 2 is in the "advertisement" state (in fact, the signal of the first channel is the first program), if the processor 104 detects that the first channel is switched from the first program to the advertisement, the state gram of the first channel in FIG. 2 is switched from the "advertisement" state to the "advertisement" state again through a path I2.

In addition, when a user utilizes the LAST key to browse the channels stored in the favorite channel list FCL, browse order of the channels stored in the favorite channel list FCL is determined according to time for the user watching each channel of the channels stored in the favorite channel list FCL, or storage order of each channel of the channels stored in the favorite channel list FCL. In addition, the favorite channel list FCL can also be operated through a user interface (for example, the favorite channel list FCL can be displayed on a television screen), so the user can utilize the LAST key to directly browse the favorite channel list FCL displayed on the television screen.

In addition, the first key, the second key, and the third key can be keys of a physical remote control, keys displayed on the television screen, or virtual keys controlled by sound, a gesture, or other methods, where the first key, the second key, and the third key can be the same or different. In addition, the first channel, the second channel, the third channel, the fourth channel, and the fifth channel can be the same or different.

In addition, in another embodiment of the present invention, when the signal of the first channel is switched from a first program to the advertisement, and the user watches the first channel over a predetermined time, the processor 104 adds the first channel to the favorite channel list FCL.

Figure 3:
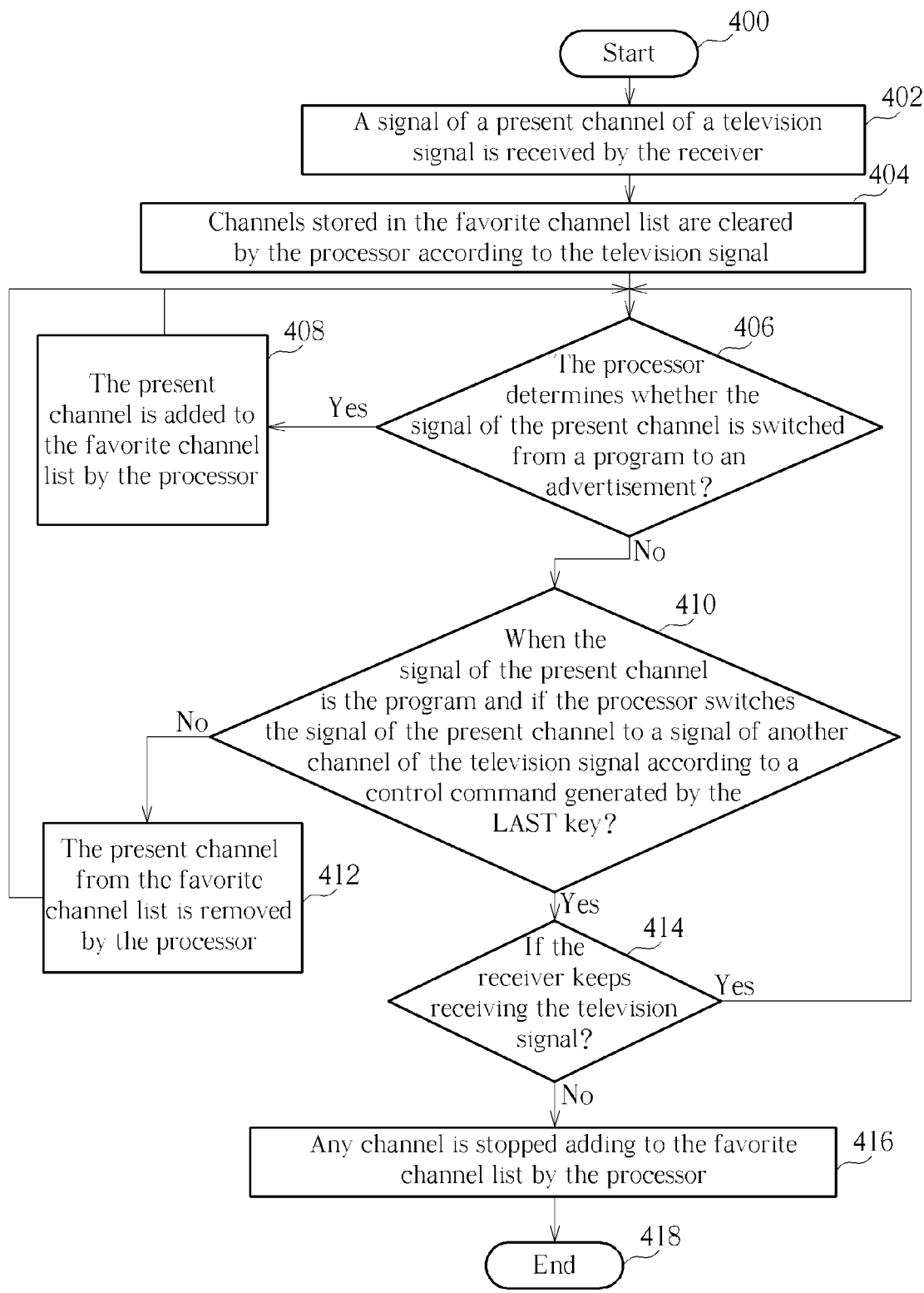
FIG. 3 is a flowchart illustrating a method for generating a favorite channel list according to another embodiment.

Please refer to FIG. 1, FIG. 2, and FIG. 3. FIG. 3 is a flowchart illustrating a method for generating a favorite channel list according to another embodiment. The method in FIG. 3 is illustrated using the device 100 in FIG. 1. Detailed steps are as follows:

Step 400: Start.

Step 402: A signal of a present channel of a television signal TS is received by the receiver 102.

Step 404: Channels stored in the favorite channel list FCL are cleared by the processor 104 according to the television signal TS.

Step 406: The processor 104 determines whether the signal of the present channel is switched from a program to an advertisement; if yes, go to Step 408; if no, go to Step 410.

Step 408: The present channel is added to the favorite channel list FCL by the processor 104, go to Step 406.

Step 410: When the signal of the present channel is the program and if the processor 104 switches the signal of the present channel to a signal of another channel of the television signal TS according to a control command generated by the LAST key; if no, Step 412; if yes, go to Step 414.

Step 412: The present channel from the favorite channel list FCL is removed by the processor 104, go to Step 406.

Step 414: If the receiver 102 keeps receiving the television signal TS; if yes, go to Step 406; if no, go to Step 416.

Step 416: Any channel is stopped adding to the favorite channel list FCL by the processor 104.

Step 418: End.

Take FIG. 2 as an example, in Step 402, the receiver 102 is switched to receive the signal of the present channel (e.g. the first channel) of the television signal TS from another signal source, and the signal of the present channel is a first program. That is to say, initial state of the state diagram of the present channel is switched from the "leaving" state to the "program" state through the path D as shown in FIG. 2. In Step 404, the processor 104 can clear the channels stored in the favorite channel list FCL before the receiver 102 receives the television signal TS according to the television signal TS, where the favorite channel list FCL is included in the memory 106 of the device 100. In Step 408, when the signal of the present channel is switched from the program (the first program) to the advertisement (the path A as shown in FIG. 2), the processor 104 adds the present channel to the favorite channel list FCL, where the processor 104 can determine that the signal of the present channel is switched from the program to the advertisement according to predetermined black frames between the program and the advertisement, and add the present channel to the favorite channel list FCL according to a determination result. But, the present invention is not limited to the processor 104 determining that the signal of the present channel is switched from the program to the advertisement according to the predetermined black frames between the program and the advertisement. That is to say, the processor 104 can also determine that the signal of the present channel is switched from the program to the advertisement according to the prior art. Meanwhile, the state diagram of the present channel is in the "advertisement" state. Then, if the advertisement is completed and the signal of the present channel is switched to the program again (the path B as shown in FIG. 2), the state diagram of the present channel is in the "program" state again. Because the processor 104 mistakes a program or an advertisement to cause the state gram of the present channel is in the "program" state (in fact, the signal of the present channel is the advertisement), if the processor 104 detects that the present channel is switched from the advertisement to the program, the state gram of the present channel in FIG. 2 is switched from the "program" state to the "program" state again through the path I1. Similarly, because the processor 104 mistakes the program or the advertisement to cause the state gram of the present channel is in the "advertisement" state (in fact, the signal of the present channel is the program), if the processor 104 detects that the present channel is switched from the program to the advertisement, the state gram of the present channel is switched from the "advertisement" state to the "advertisement" state again through the path I2.

In Step 410, when the processor 104 switches the signal (the program) of the present channel to a signal of another channel of the television signal TS (the path F as shown in FIG. 2) according to a control command generated by the LAST key, the processor 104 does not remove the present channel from the favorite channel list FCL. Meanwhile, the state diagram of the present channel is in the "leaving" state. In addition, in Step 414, after the processor 104 switches the signal of the present channel to a signal of another channel of the television signal TS according to the control command generated by the LAST key, a state diagram of another channel can be switched from the "leaving" state to the "program" state (the path D as shown in FIG. 2) or to the "advertisement" state (the path E as shown in FIG. 2) according to the signal of another channel (e.g. a program or an advertisement), respectively. In Step 416, when the processor 104 switches to receive a signal from another signal source according to a control command generated by the signal source key, the processor 104 stops adding any channel to the favorite channel list FCL.

In Step 412, when the processor 104 switches the signal of the present channel to a signal of another channel of the television signal TS (the path G as shown in FIG. 2) according to a control command generated by a key, the processor 104 can remove the present channel from the favorite channel list FCL. Meanwhile, the state diagram of the present channel is in the "leaving" state. In addition, in Step 414, after the processor 104 switches the signal of the present channel to the signal of another channel of the television signal TS according to the control command generated by a key, if the receiver 102 keeps receiving the television signal TS, a state diagram of another channel can be switched from the "leaving" state to the "program" state (the path D as shown in FIG. 2) or to the "advertisement" state (the path E as shown in FIG. 2) according to the signal of another channel (e.g. a program or an advertisement), respectively. In Step 416, after the processor 104 switches to receive the signal of another signal source from the television signal TS according to the control command generated by the signal source key, the processor 104 stops adding any channel to the favorite channel list FCL.

To sum up, the method for generating a favorite channel list and the related device thereof utilize the processor to add a channel of a television signal to the favorite channel list when a signal of the channel of the television signal is switched from a program to an advertisement. Therefore, compared to the prior art, because conditions for the present invention generating the favorite channel list do not include time for the user keeping watching a channel of the television signal, the present invention can overcome disadvantages of the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for generating a favorite channel list, wherein a device for generating the favorite channel list comprises a receiver and a processor, the method comprising:
    receiving a signal of a first channel of a television signal by the receiver;
    clearing channels stored in the favorite channel list by the processor before the receiver receives the television signal according to the television signal; and
    adding the first channel to the favorite channel list by the processor when the signal of the first channel is switched from a first program to an advertisement.

2. A method for generating a favorite channel list, wherein a device for generating the favorite channel list comprises a receiver and a processor, the method comprising:
    receiving a signal of a first channel of a television signal by the receiver;
    clearing channels stored in the favorite channel list by the processor before the receiver receives the television signal according to the television signal; and
    not removing the first channel from the favorite channel list and executing a corresponding operation by the processor according to whether the receiver keeps receiving the television signal when the signal of the first channel is a first program and the processor switches the signal of the first channel to a signal of a second channel of the television signal according to a control command signal generated by a LAST key.

3. The method of claim 2, further comprising:
    stopping adding any channel to the favorite channel list by the processor when the receiver does not keep receiving the television signal.

4. A device for generating the favorite channel list, the device comprising:
    a receiver for receiving a signal of a first channel of a television signal; and
    a processor for determining whether the signal of the first channel is switched from a first program to a first advertisement, wherein the processor adds the first channel to the favorite channel list when the signal of the first channel is switched from the first program to the first advertisement.

5. The device of claim 4, wherein the processor is further used for not removing a second channel from the favorite channel list when a signal of the second channel of the television signal is a second program and the processor switches the signal of the second channel to a signal of a third channel of the television signal according to a control command signal generated by a LAST key.

6. The device of claim 5, wherein after the processor switches the signal of the second channel to the signal of the third channel, and the receiver does not keep receiving the television signal, the processor stops adding any channel to the favorite channel list.

7. The device of claim 4, wherein the processor is further used for removing a second channel from the favorite channel list when a signal of the second channel of the television signal is a second program and the processor switches the signal of the second channel to a signal of a third channel of the television signal according to a control command.

8. The device of claim 4, wherein the processor is further used for clearing channels stored in the favorite channel list before the receiver receives the television signal according to the television signal.

* * * * *